UNITED STATES PATENT OFFICE.

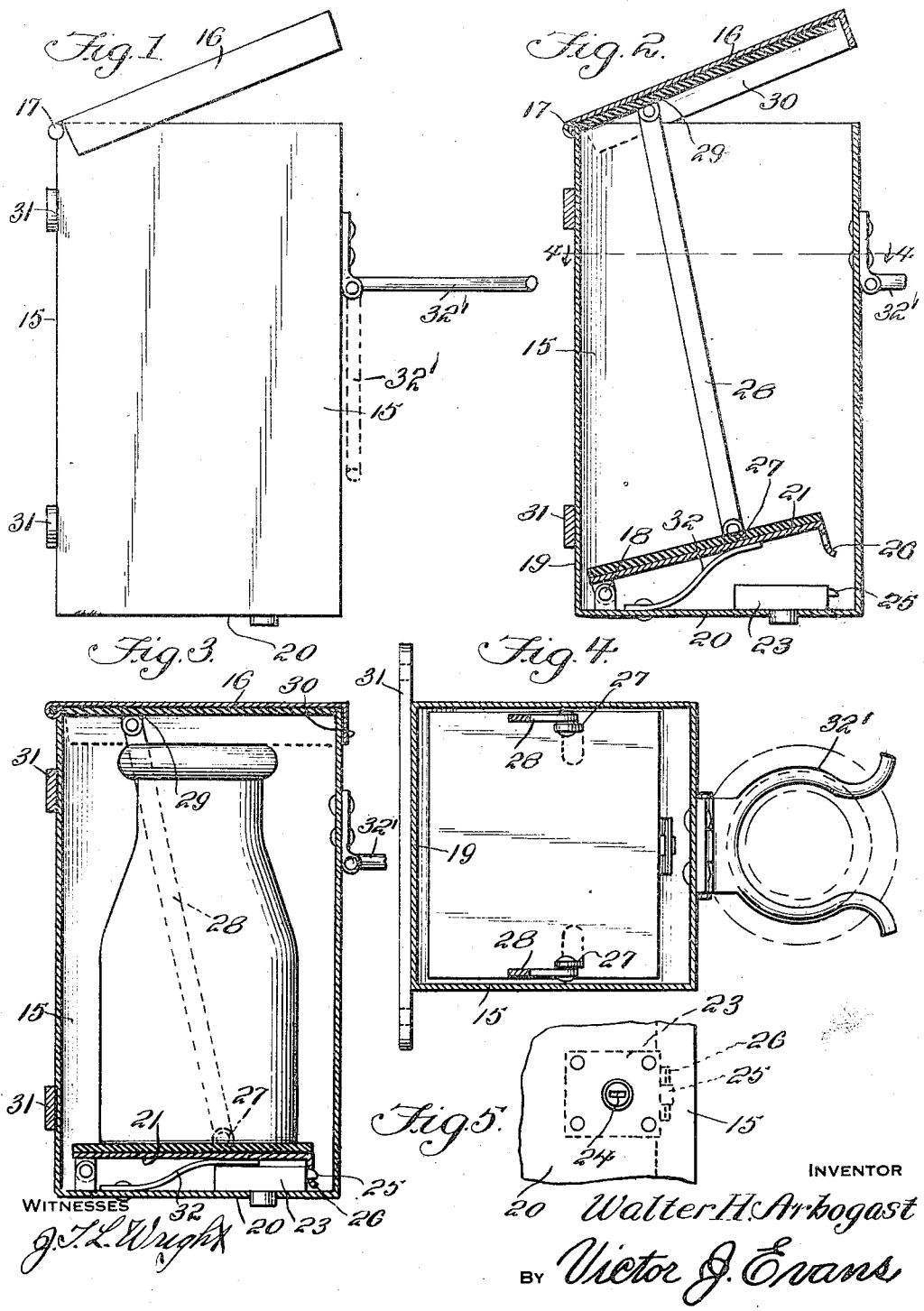

WALTER H. ARBOGAST, OF BARBERTON, OHIO.

MILK-BOTTLE RECEPTACLE.

1,305,865.　　　　　Specification of Letters Patent.　　Patented June 3, 1919.

Application filed July 22, 1918. Serial No. 246,098.

*To all whom it may concern:*

Be it known that I, WALTER H. ARBOGAST, a citizen of the United States, residing at Barberton, in the county of Summit and State of Ohio, have invented new and useful Improvements in Milk-Bottle Receptacles, of which the following is a specification.

This invention relates to boxes or receptacles of that class or type which are utilized for the reception of merchandise, being provided with automatic locking means for the purpose of preventing petty thieving of merchandise delivered at residences, and the invention has particular reference to a box or receptacle in which a milk bottle may be placed and securely protected until removed by the authorized party.

The invention has for its object to produce a device of simple and inexpensive construction which may be readily applied to a door, door post, wall or the like in a convenient position to receive a bottle of milk, the box being provided with a locking device which is actuated automatically by the insertion of the milk bottle.

A further object of the invention is to simplify and improve the construction, assemblage and operation of the detailed parts of the device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawing:—

Figure 1 is a side elevation of a device constructed in accordance with the invention.

Fig. 2 is a vertical sectional view, the lid of the box being shown open.

Fig. 3 is a vertical sectional view showing the lid closed and the milk bottle in position.

Fig. 4 is a horizontal sectional view taken on the line 4—4 in Fig. 2.

Fig. 5 is a fragmentary bottom plan view.

Corresponding parts in the several figures are denoted by like characters of reference.

The box or receptacle 15 of the improved device may be constructed of sheet metal or other material and of proper size and shape to contain one or more milk bottles or other merchandise. The box is provided with a lid 16 connected by a hinge 17 with the rear wall thereof. Pivotally mounted by means of a hinge 18 adjacent the rear wall 19, and disposed a short distance above the bottom member 20 is a trap door 21 which is normally supported with its free edge in an upwardly tilted position within the box by means of a spring 32. Secured on the top face of the bottom member 20 is an automatic lock 23 having a keyhole 24 which is accessible through the bottom of the box, said lock including a latch 25 adapted to be engaged by a hasp 26 carried by the trap door. The trap door 21 is provided adjacent to the side edges thereof with lugs 27, said lugs being connected by means of rods 28 with corresponding lugs 29 adjacent to the side flanges 30 of the lid 16. It will be observed that when the hasp 26 is disengaged from the locking latch 25 the spring 32 will force the free end of the trap door upwardly with respect to the lock, thus also moving the lid 16 to a partly open position through the medium of the connecting rods 28.

The box or receptacle is provided on the rear wall thereof with brackets 31 which are apertured for the passage of fastening members such as nails or screws whereby the device may be secured in position. The box or receptacle is also provided with a spring clamp or clasp 32' adapted to hold an empty milk bottle.

The improved device may be mounted upon the door or wall of a residence in a convenient position to receive merchandise such as a milk bottle. The box is normally left open. When the milkman arrives, he removes the empty bottle and places the full bottle within the receptacle, the lid being first moved by the man to a sufficiently open position to enable the bottle to be inserted. As the full bottle is placed on the trap door, the latter will be forced downwardly by the weight of the bottle until the hasp 26 engages the locking latch 25. By the action of the connecting rods 28 the lid will simultaneously be moved to a closed position where it is securely retained by the action of the locking device, thus preventing the removal of the contents of the box until the latter is opened by an authorized person possessing the proper key for the lock.

The improved device may obviously be made of any desired size and shape to contain one or more milk bottles or other merchandise. While simple in construction and capable of being produced at a very moderate expense, it will form a complete safeguard against the unauthorized removal of merchandise left therein. It will be particularly noted that the trap door and the locking mechanism are located entirely within the box or receptacle and that said parts are thus safeguarded against being tampered with by unauthorized parties.

I claim:—

1. A receptacle of the class described comprising a box having a back wall and a bottom member, a lid hinged to the upper edge of the back wall, a trap door hinged adjacent the back wall a short distance above the bottom member, said lid and trap door having lugs at the sides thereof, rods pivotally connected with the lugs and disposed within the box thereby connecting the lid with the trap-door, a spring normally forcing the free end of the trap door in an upward direction and locking means within the box for securing the free end of the trap door in depressed position against the tension of the spring.

2. A receptacle of the class described comprising a box having a back wall and a bottom member, a lid hinged to the upper edge of the back wall, a trap door hinged adjacent the back wall and disposed above the bottom member, said lid and trap door having lugs at the sides thereof, rods pivotally connected with the lugs and disposed within the box thereby connecting the lid with the trap-door, a spring normally forcing the free end of the trap door in an upward direction and locking means within the box for securing the free end of the trap door in depressed position against the tension of the spring, said means including an automatic lock secured on the top face of the bottom member and including a latch, and a latch engaging hasp carried by the trap door.

3. A receptacle of the class described comprising a box having a back wall and a bottom member, a lid hinged to the upper edge of the back wall, a trap door hinged adjacent the back wall and disposed above the bottom member, rods pivotally connected with the lid and trap-door, a spring normally forcing the free end of the trap door in an upward direction and locking means within the box for securing the free end of the trap door in depressed position against the tension of the spring, said means including an automatic lock secured on the top face of the bottom member and including a latch, and a latch engaging hasp carried by the trap door, said lock having a keyhole accessible through the bottom member of the box.

In testimony whereof I affix my signature.

WALTER H. ARBOGAST.